(12) United States Patent
Hayashi

(10) Patent No.: US 7,158,737 B2
(45) Date of Patent: Jan. 2, 2007

(54) CARRIAGE STRUCTURE FOR IMAGE-READING DEVICE

(75) Inventor: Eiichi Hayashi, Saitama (JP)

(73) Assignee: Fujinon Corporation, Saitama (JP)

( * ) Notice: Subject to any disclaimer, the term of this patent is extended or adjusted under 35 U.S.C. 154(b) by 793 days.

(21) Appl. No.: 10/367,909

(22) Filed: Feb. 19, 2003

(65) Prior Publication Data
US 2003/0184817 A1 Oct. 2, 2003

(30) Foreign Application Priority Data
Mar. 29, 2002 (JP) .............................. 2002-096759

(51) Int. Cl.
*G03G 15/30* (2006.01)
(52) U.S. Cl. ...................... 399/211; 399/213
(58) Field of Classification Search ................ 399/211, 399/212, 213; 400/693
See application file for complete search history.

(56) References Cited

U.S. PATENT DOCUMENTS 5,628,575 A * 5/1997 Morikawa et al. .......... 400/693
2002/0034410 A1 3/2002 Bartolome et al.

* cited by examiner

*Primary Examiner*—Hoang Ngo
(74) *Attorney, Agent, or Firm*—Arnold International; Clyde I. Coughenour; Bruce Y. Arnold

(57) ABSTRACT

A carriage structure is disclosed for an image-reading device that acquires image data from a document while an optical unit is moved along the document. The carriage structure is formed of molded plastic with reinforcing sheet metal members incorporated therein, and the optical unit, including a light source, photoelectric conversion device and optical elements, are positioned at predetermined positions on the carriage and are supported by, and incorporated within, the carriage structure. The reinforcing sheet metal members are bent into at least one of an L-shape, a V-shape, a crank shape, or a tilted V-shape in order to achieve a desired rigidity for the carriage structure.

6 Claims, 6 Drawing Sheets

CARRIAGE STRUCTURE FOR IMAGE-READING DEVICE

BACKGROUND OF THE INVENTION

Among prior art image-reading devices (sometimes termed "image scanners" or simply "scanners"), there are those in which an optical unit, which includes optical elements such as mirrors and lenses which guide light that is reflected from a document to a photoelectric conversion device, is moved along a document in order to obtain image data from the document. The optical unit is incorporated into a carriage and a driving mechanism causes the carriage to move. For example, a driving belt such as a timing belt or the like may be moved back and forth by the output rotation of a driving motor, with the carriage being connected to the driving belt. In addition, to guide the movement of the carriage, a guide rod extends in the direction of movement (i.e., in the lengthwise direction) and is connected to the carriage.

The carriage is molded of plastic (i.e., a synthetic resin) and is formed into a suitable shape. A light source, photoelectric conversion device and optical elements are incorporated at predetermined positions on the carriage.

In order to improve portability and storability of an image-reading device, there is market demand to make the carriage which supports the optical unit as thin as possible, thereby enabling the image-reading device itself to be thinner. However, the carriage must be longer than the width of the original document to be scanned. Hence, in order to be able to acquire images from, for example, A4 size paper, the carriage must be about 220 mm in length. Designing the carriage to have a sufficient thickness in order to properly support such a long carriage becomes an impediment to the objective of making the carriage thinner. In other words, in order to achieve sufficient thinness of the image-reading device, it is necessary to provide a carriage that is thinner than deemed advisable in terms of keeping the carriage from undergoing strain. Such strain, or bowing of the carriage, will jeopardize the accuracy in positioning of the optical elements carried by the carriage. Additionally, there is a concern that the length of the light paths at the edge and at the center of the carriage may become different, so that the image data acquired is not faithful to the document being scanned. This will cause images, obtained by reproducing the image data, to be unclear.

BRIEF SUMMARY OF THE INVENTION

The present invention relates to a carriage structure in an image-reading device such as a scanner or the like that scans images formed on an original document and acquires image data while an optical unit mounted on the carriage is moved along the original document. The invention provides a carriage structure for an image-reading device in which the carriage is made thinner than prior art carriages for image-reading devices. This enables the image-reading device itself to be made thinner.

The carriage structure of the image-reading device of the present invention is used to acquire image data of a document being scanned while an optical unit, in which a light source and a photoelectric conversion device, and the like, are incorporated into the carriage, is moved along the document. In order to make the carriage thin and yet able to accurately support the light source and the photoelectric conversion device, reinforcing sheet metal members are incorporated into the body of the carriage.

Because the shape of the carriage can be maintained by using reinforcing sheet metal, bowing of the carriage can be minimized. Accordingly, the optical path lengths at the edge verus at the center of the carriage can be maintained substantially equal so that image data that is faithful to that of the document being scanned can be acquired, thereby enabling a clear image to be reproduced. Thus, the carriage structure according to the invention is formed so as to have a suitable rigidity.

In addition, the carriage structure for an image-reading device may have the reinforcing sheet metal bent into a suitable shape, as will now be discussed in detail. By bending the reinforcing sheet metal into a suitable shape, the rigidity of the reinforcing sheet metal is increased. Consequently, it is possible to limit the amount of bowing of the carriage. As a suitable shape of the reinforcing sheet metal, it is possible to employ an L-shape, a V-shape, a crank shape, or a titled V-shape. Having selected one of these shapes for the reinforcing sheet metal, it is easy to accomplish the bending process to form the reinforcing sheet metal into such a shape.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

The present invention relates to a carriage structure in an image-reading device. Among image-reading devices, there are types in which optical units, which include optical elements such as reflective mirrors and lenses that form a light path by guiding light reflected from an original document to a photoelectric conversion device, are moved along the original document in order to read the image data on the original document. The optical unit is incorporated into a carriage. In a driving mechanism that causes the carriage to move, a driving belt such as a timing belt or the like is moved back and forth by the output rotation of a driving motor, and the carriage is connected to the driving belt. In addition, in order to guide the movement of the carriage, a guide rod is connected to the carriage, and the carriage moves in the lengthwise direction of the guide rod. The carriage may be molded of plastic (i.e., synthetic resin) into a suitable shape. The light source, photoelectric conversion device and optical elements are incorporated at predetermined positions on the carriage.

In order to improve portability and storability, it is desirable to make the optical unit as thin as possible. This results in it being desirable to make the carriage which incorporates the optical unit as thin as possible. However, the carriage must be longer than the width of the original document. In order to be able to acquire the images on an A4-size original document, for example, the width must be around 220 mm. Designing a thin carriage to support such a length could become an impediment to the objective of making the image-reading device thinner. In other words, whereas a thin carriage is desirable in terms of portability and stowability, making the carriage thinner makes it more difficult to maintain a desired rigidity of the carriage so that the carriage does not bow. When the carriage bows, there is the concern that the position of the optical elements relative to the light path may shift. Additionally, there is the concern that the length of the light paths at the edge versus at the center of the carriage may become different, so that the image data acquired is not faithful to the original document and the image resulting from reproducing the image data will be unclear.

Figure 5:
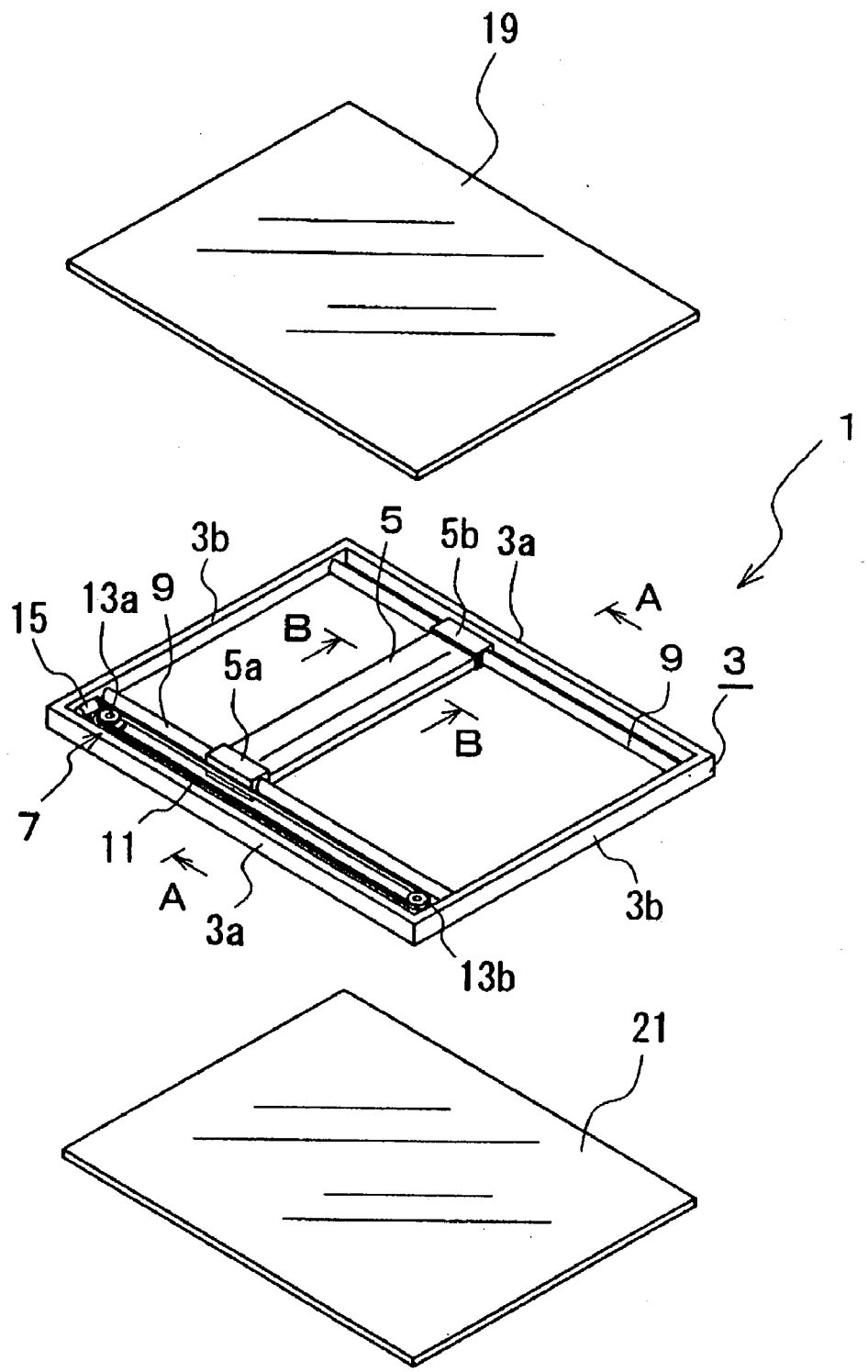
FIG. 5 shows an exploded oblique view of the structure of an image-reading device in which is a carriage structure according to the present invention is incorporated.
Figure 6:
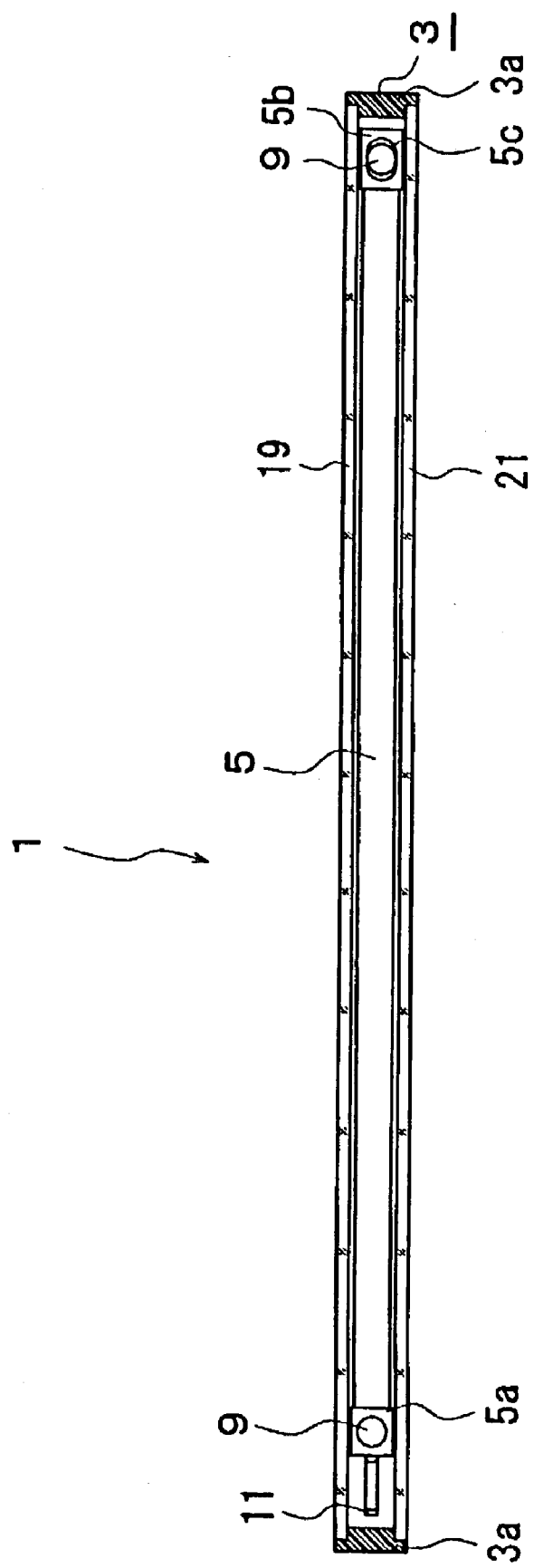
FIG. 6 is a cross-sectional view taken along line A—A in FIG. 5.

The carriage structure of an image-reading device according to the present invention will now be described in detail, with reference to the preferred embodiments shown in the drawings. First, an overview of an image-reading device that incorporates a carriage structure according to the invention will be explained. FIG. 5 and FIG. 6 are drawings showing the structure of a image-reading device 1 according to the present invention. FIG. 5 shows an exploded oblique view, and FIG. 6 shows a cross-sectional view of the assembled image-reading device 1 taken along line A—A in FIG. 5. As shown in FIG. 5, the image-reading device 1 comprises a substantially rectangular frame 3 corresponding to the size of the original documents from which image data is to be acquired, a carriage 5, and a drive mechanism 7 for moving the carriage 5. On the sides of the carriage 5 are provided guide parts 5a and 5b in which guide holes are formed. Guide rods 9 are provided along the lengthwise direction of the frame 5, and the guide holes of the guide parts 5a and 5b are made to interlock with the guide rods 9. A guide hole 5c formed in the guide part 5b is formed as an oval hole as shown in FIG. 6, and the guide rod 9 is inserted therein so as to have some play and so as to permit discrepancies in dimensions in the direction orthogonal to the direction of movement (hereinafter called the "sideways direction" of the carriage) of the carriage 5.

A drive belt 11 is placed between one of the guide rods 9 and one of the lengthwise walls 3a of the frame 3. The drive belt 11 runs between a drive-side pulley 13a and a driven-side pulley 13b positioned so as to be free to rotate near both of the short walls 3b of the frame 3. Output rotations from a drive motor 15 are appropriately geared to and transferred to the drive-side pulley 13a. A portion of the drive belt 11 is anchored to the guide part 5a.

Plate glass 19 is installed on top of the frame 3, and an original document from which image data is to be acquired is loaded onto the plate glass 19. In addition, a base plate 21 is installed on the underside of the frame 3. In the configuration of the embodiment, a glass plate is used for the base plate 21, and even when the frame 3 is made thin, the glass plate provides the frame 3 with sufficient rigidity.

Figure 4:
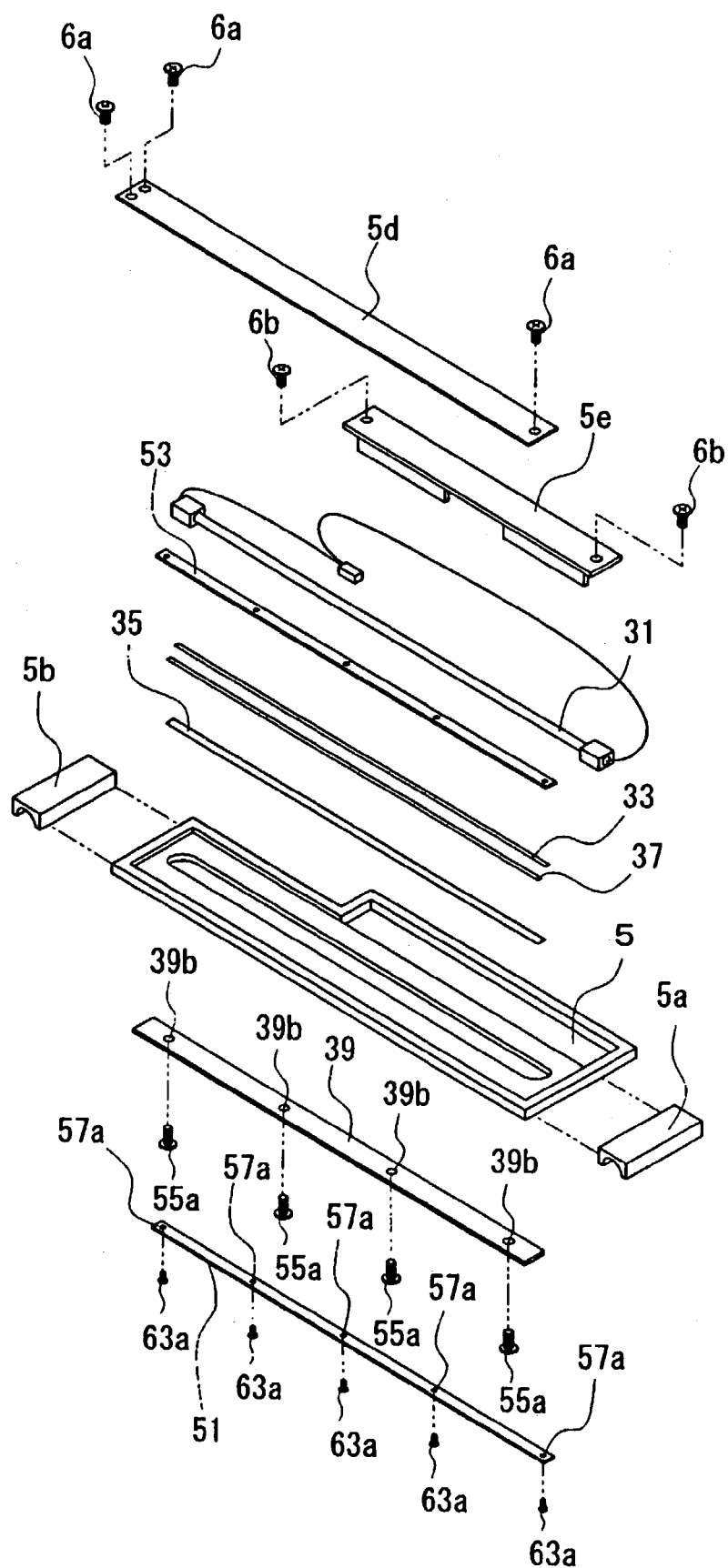
FIG. 4 is an exploded oblique drawing of a carriage provided with the structure according to the present invention.

FIG. 4 is an exploded oblique view showing a carriage provided with the structure of the present invention, and an optical unit. Incorporated in the carriage 5 is an optical unit that includes: a light source 31 that illuminates the original document, a photoelectric conversion device 41 (see FIG. 1) that converts light reflected from the original document into electrical energy, a first reflective mirror 33 onto which light reflected from the original document is incident, a rod lens array 35 with column-shaped rod lenses arranged in parallel onto which light reflected by the first reflective mirror 33 is incident and is collected, and a second reflective mirror 37 that reflects light that has passed through the rod lens array 35 toward the photoelectric conversion device 41. In other words, an optical path that guides light reflected from the original document to the photoelectric conversion device 41 is formed by the first reflective mirror 33, the various rod lenses of the rod lens array 35 and the second reflective mirror 37.

Figure 1:
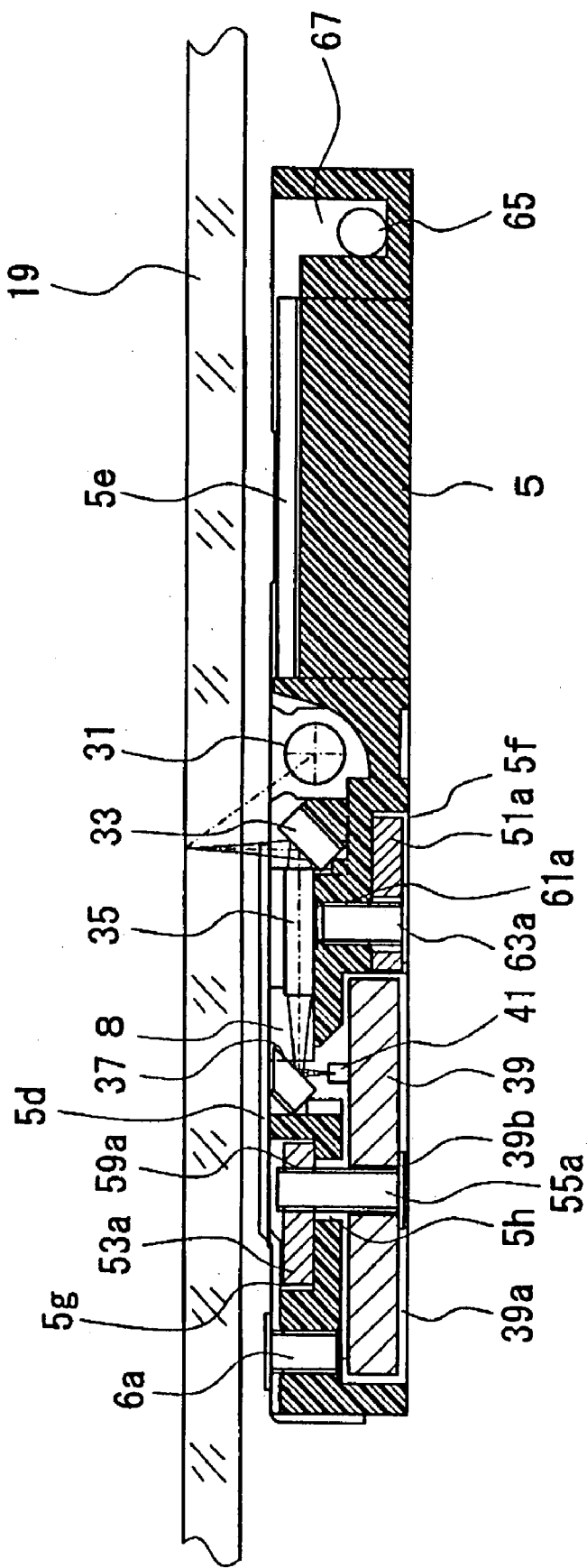
FIG. 1 shows the carriage structure according to a first embodiment of the present invention when incorporated into an image-reading device, and is a cross-sectional view taken along line B—B in FIG. 5.

As shown in FIG. 1, the optical unit is seated in a unit holder 8 includes an indentation of suitable shape formed in the top surface of the carriage 5. The photoelectric conversion device 41 is incorporated into a sensor substrate 39. The optical unit is incorporated into the carriage 5 and is covered by covers 5d and 5e. In addition, the guide parts 5a and 5b are attached to the sides of the carriage 5. Furthermore, reinforcing sheet metal members 51a and 53a are incorporated into the carriage 5.

FIG. 1 is a cross-sectional view showing the structure of the first embodiment of the carriage 5 into which the reinforcing sheet metal members 51a and 53a is incorporated. The reinforcing sheet metal members 51a and 53a according to the first embodiment both have a strip shape, the length thereof being substantially equivalent to the width of the carriage 5. A first indentation 5f is formed below the rod lens array 35 in the bottom surface of the carriage 5, and a second indentation 5g is formed on top of the sensor substrate 39 in the top surface of the carriage 5. The first reinforcing sheet metal member 51a is seated in the first indentation 5f, and the second reinforcing sheet metal member 53a is seated in the second indentation 5g. In addition, the sensor substrate 39 is seated in a substrate indentation 39a formed in the bottom surface. A penetrating hole 5h is also formed which penetrates the bottom surfaces of the substrate indentation 39a and second indentation. 5g, and an anchoring screw 55a that penetrates a hole 39b formed in the sensor substrate 39 is fitted into a female screw 59a formed in the second reinforcing sheet metal member 53a.

In addition, a female screw 61a is formed in the bottom of the first indentation 5f, and into it is fitted an anchoring screw 63a that penetrates a hole 57a (FIG. 4) formed in the first reinforcing sheet metal member 51. In other words, by tightening the anchoring screw 55a, the sensor substrate 39 and the second reinforcing sheet metal member 53a are attached to the carriage 5, and by tightening the anchoring screw 63a, the first reinforcing sheet metal member 51a is attached to the carriage 5. A harness indentation 67 into which a harness 65 for the light source 31 and the like is seated is formed at one end of the carriage 5. In addition, the cover 5d is anchored to the carriage 5 by fastening screws 6a, and the cover 5e is anchored to the carriage 5 by fastening screws 6b.

When the optical unit is seated in the frame 3 and incorporated into the carriage 5, the plate glass 19 is placed on top of the carriage 5 on which the original document is loaded, as shown in FIG. 1. When the original document is illuminated by the light source 31, the light reflected therefrom is incident on the first reflective mirror 33, is reflected in a substantially orthogonal direction and is incident onto the various rod lenses of the rod lens array 35. Light that has been condensed appropriately by the rod lenses exits from the various rod lenses and is incident on the second reflective mirror 37. The second reflective mirror reflects the incident light in a substantially orthogonal direction opposite to the direction of the plate glass 19, guiding the light to the photoelectric conversion device 41.

With the carriage structure according to the first embodiment, the rigidity of the carriage 5 is increased because the reinforcing sheet metal members 51a and 53a are incorporated into the carriage 5. Through this, bowing of the carriage 5 is prevented even when the device is made thinner. In particular, because the first reinforcing sheet metal member 51a is positioned below the rod lens array 35 that guides the light reflected from the original document to the photoelectric conversion device 41, bowing of the rod lens array 35 is prevented, and changing of the optical path length from the original document surface to the photoelectric conversion device 41 between the edges and the center of the carriage 5 is prevented. In other words, because the rod lens array 35 is composed of column-shaped rod lenses arranged in parallel, bowing can readily occur between adjacent rod lenses, but by using the first reinforcing sheet metal member 51a, bowing can be prevented.

Figure 2:
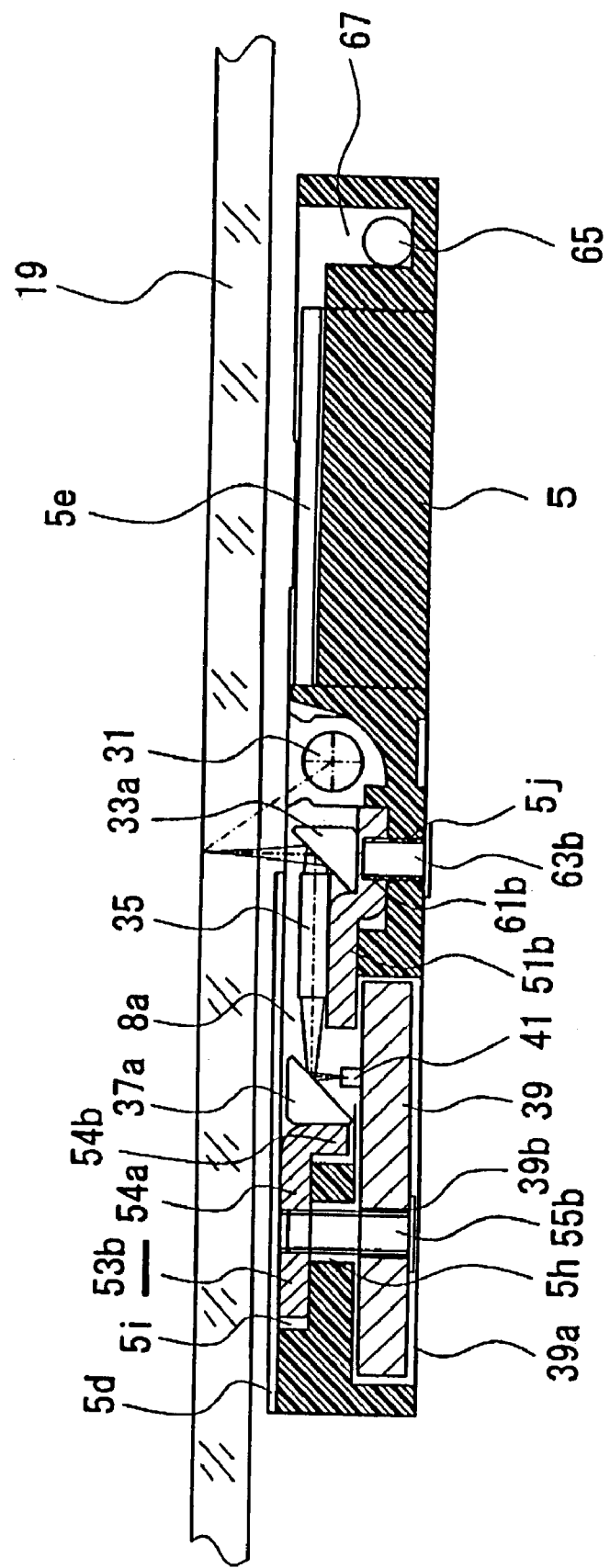
FIG. 2 shows the carriage structure according to a second embodiment of the present invention, and is a cross-sectional view equivalent to FIG. 1.

The carriage structure according to a second embodiment shown in FIG. 2 will be explained next. Parts that are the same as in the embodiment shown in FIG. 1 are labeled with the same reference numbers. As shown in FIG. 2, the second reinforcing sheet metal member 53b is bent so as to have a substantially L-shaped cross-section, and the leg 54a on the longer side thereof is seated in second indentation 5i. The second indentation 5i is linked to the unit holder 8a in which is seated the optical unit that includes the second reflective mirror 37a, and the leg 54b on the short side of the L-shaped second reinforcing sheet metal member 53b is positioned inside the unit holder 8a, the tip thereof pointing downward.

In addition, the first reinforcing sheet metal member 51b is formed with the cross-section substantially crank-shaped, as shown in FIG. 2, and is positioned on the bottom surface of the unit holder 8a. The bottom surface of the unit holder 8a has a step formed to coincide with the substantially crank-shaped cross-section of the first reinforcing sheet metal member. In addition, the first reflective mirror 33a and the second reflective mirror 37a are both formed on the oblique surface of rods having a substantially isosceles right triangle cross section, and one of the other surfaces of each of these triangles abuts the first reinforcing sheet metal member 51b or the second reinforcing sheet metal member 53b.

The first reinforcing sheet metal member 51b is attached to the carriage 5 by an anchoring screw 63b that penetrates a hole 5j formed in the carriage 5 and is threaded into a female thread 61b formed in the first reinforcing sheet metal member 51b. In addition, the second reinforcing sheet metal member 53b and the sensor substrate 39 are attached to the carriage 5 by an anchoring screw 55b, which passes through the hole 39b in the sensor substrate 39. The anchoring screw 55b that penetrates the hole 5h in the substrate indentation 39a and the second indentation 5i is threaded into a female thread (not shown) formed in the second reinforcing sheet metal member 53b, as in the first embodiment.

With the carriage structure according to the second embodiment, the first reinforcing sheet metal member 51b and the second reinforcing sheet metal member 53b are both bent in the center in the width-wise direction. Because the reinforcing sheet metal members 51b and 53b can resist a larger bending moment than the reinforcing sheet metal members 51a and 53a formed in a strip shape, it is possible to maintain the flatness of the carriage with greater certainty.

In the carriage structure according to the second embodiment, the reflective mirrors 33a and 37a are formed in a column shape. Hence the strength of the reflective mirrors 33a and 37a is high, preventing damage to them during operation when incorporated into the carriage S.

Figure 3:
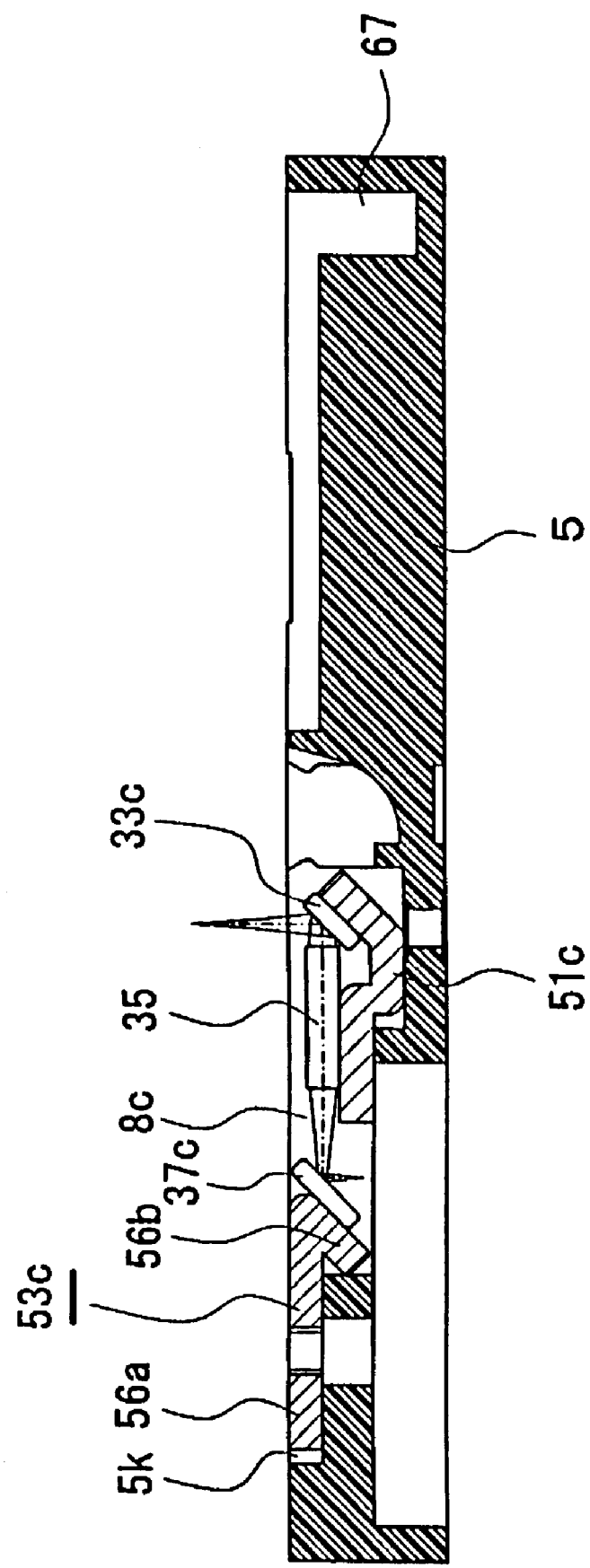
FIG. 3 shows the carriage structure according to a third embodiment of the present invention, and is a cross-sectional view equivalent to FIG. 1.

Next, the carriage structure according to a third embodiment shown in FIG. 3 will be described. Here, parts that are the same as in Embodiment 1 shown in FIG. 1 are labeled with the same reference numbers, and some parts are omitted. As shown in FIG. 3, the tip of the second reinforcing sheet metal member 53c is bent so as to have a substantially V-shaped cross-section, and the leg 56a on the long side thereof is seated in a second indentation 5k. The second indentation 5k is formed so as to connect to the unit holder 8c in which the optical unit is seated, and the tip 56b that is formed into a V-shape is positioned with the tip facing downward in the unit holder 8c.

In addition, the first reinforcing sheet metal member 51c is bent so as to have a substantially crank-shaped cross-section and one end thereof is formed into a tilted V-shape and the sheet metal is placed on the bottom surface of the unit holder 8c such that the open side of the tilted V-shape is pointing upward, as shown in FIG. 3. A step is formed in the bottom surface of the unit holder 8c so as to coincide with the substantially crank-shaped cross-sectional shape of the first reinforcing sheet metal member. Furthermore, the first reflective mirror 33c is attached to the inner side of the tilted V-shape of the first reinforcing sheet metal member 51c, and the second reflective mirror 37c is attached to the outer side of the V-shape of the second reinforcing sheet metal member 53c.

With the carriage structure according to the third embodiment, the first reinforcing sheet metal member 51c and the second reinforcing sheet metal member 53c are both bent in the center in the width-wise direction. Because the reinforcing sheet metal members 51c and 53c can resist a larger bending moment than the reinforcing sheet metal members 51a and 53a formed in a strip shape, it is possible to maintain the flatness of the carriage with greater certainty.

In addition, in the carriage structure according to the third embodiment, the first reflective mirror 33c is attached to the first reinforcing sheet metal member 51c and the second reflective mirror 37c is attached to the second reinforcing sheet metal member 53c. Therefore, it is possible to attach the reinforcing sheet metal members 51c and 53c to the carriage 5 with the reflective mirrors 33c and 37c being pre-attached. In particular, in making the carriage 5 thinner and lighter in weight, the reflective mirrors 33c and 37c are made to be extremely thin and are easily damaged when being attached to a predetermined position on the carriage 5. There is also the concern that the attachment precision may decrease. However, by attaching to the carriage 5 the reinforcing sheet metal members 51c and 53c on which the reflective mirrors 33c and 37c are pre-attached, it is possible to secure the desired precision of attachment for the reflective mirrors 33c and 37c while preventing the mirrors from being damaged.

In each of the embodiments described above, it is possible to mold the carriage 5 of plastic (i.e., synthetic resin). However, when the carriage 5 is made thinner, there is a concern that the center part may bow in relation to the width thereof. When the reinforcing sheet metal members 51a and 53a are made thinner, there is the concern that it will be impossible to withstand the bowing of the carriage and the sheet metal members will bow along with the carriage. Hence, the carriage 5 is made from a flexible material. For example, it may be made from a hard rubber or polyethylene not containing glass or other reinforcing materials. By making the carriage 5 thinner using such pliable material, the shape of the carriage 5 is prescribed by the reinforcing sheet metal members 51a and 53a, and it becomes possible to maintain the flatness of the carriage.

The invention being thus described, it will be obvious that the same may be varied in many ways. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A carriage for an image-reading device that acquires image data from a document while an optical unit is moved along the document, said carriage formed of molded plastic with reinforcing sheet metal members incorporated into the body of the carriage, said optical unit including a light source, photoelectric conversion device and optical elements that are at predetermined positions on the carriage and are supported by, and incorporated within, the carriage.

2. The carriage for an image-reading device as set forth in claim 1, wherein at least one of said reinforcing sheet metal members has been bent into an L-shape.

3. The carriage for an image-reading device as set forth in claim 1, wherein at least one of said reinforcing sheet metal members has been bent into a V-shape.

4. The carriage for an image-reading device as set forth in claim 1, wherein at least one of said reinforcing sheet metal members has been bent into a crank shape.

5. The carriage for an image-reading device as set forth in claim 1, wherein at least one of said reinforcing sheet metal members has been bent into a slanted V-shape.

6. The carriage for an image-reading device according to claim 1, wherein said reinforcing sheet metal members are positioned within indentations formed in said molded plastic.

* * * * *